Patented Aug. 14, 1928.

1,681,155

UNITED STATES PATENT OFFICE.

ISADORE SIDNEY MELLANOFF, OF PHILADELPHIA, PENNSYLVANIA, ASSIGNOR TO KEMIKAL INC., OF PHILADELPHIA, PENNSYLVANIA, A CORPORATION OF DELAWARE.

PLASTIC MATERIAL FROM PEAT AND PROCESS OF PRODUCING.

No Drawing.     Application filed February 23, 1928. Serial No. 256,492.

My invention relates to the production of new compositions suitable for molding, and my object is to devise methods for producing the same.

The chemical composition of peat ([1]) is regarded as a mixture of water, inorganic matter (calcium and iron compounds), vegetable fibers and humus acid (such as humic, ulmic, crenic, apocrenic, etc.). According to H. Bornträger (Zeit. Anal. Chem., 39, 694, 1900; 40, 639, 1901) the black varieties of peat contain as much as 60% of humus acids.

According to Charles A. Davis ([2]) several substances possessing acid properties have been isolated from peat. Among these substances are humic, ulmic, geic, crenic, pectic and other acids. By some writers these compounds are all classed together under the comprehensive name humus.

The first step in the operation is to add peat to a hot alkaline solution. The mixture is heated until most of the peat goes into solution. The alkali will first react with the acid principles in the peat forming soluble compounds. The remaining substances, in the peat, are made to go into solution by continued heat, presence of alkali and the soluble alkali compounds. I have found, that peat dissolved in an alkaline solution can be precipitated by the addition of sulphuric acid, acetic acid, or other acids.

To prove that alkali compounds are formed, I have dissolved a known amount of peat (5 grams) in a 100 cc. of an alkaline solution (containing ten grams of sodium hydroxide), and found that the alkaline solution of peat, required less acid (of known normality) to neutralize the alkali in this solution, than the ten grams of sodium hydroxide would have required in an aqueous solution.

By the term "alkaline solution" I mean a solution of an oxide or hydroxide of an alkali metal or alkaline earth.

In practicing the invention, I allow suitable amounts of an alkaline solution of peat, a phenol and an aldehyde to react in such a manner, that there should be a transformation into a soluble and fusible body. I then convert this reaction product, either alone or compounded with suitable filling materials, into insoluble and infusible bodies by the action of heat or the combined action of heat and pressure.

In the heretofore known phenol-formaldehyde condensation reaction there has been a formation of two liquids which will separate or stratify on standing which may indicate that the condensation product is not soluble in the liquid. In my process, on the other hand, there is no such separation, as my condensation product seems to remain more or less evenly distributed in the entire solution.

By the term "phenol" I mean phenol ($C_6H_5OH$) or its homologues, as cresol, etc., or their derivatives, or mixtures of these products.

By the term "aldehyde" I mean formaldehyde, acetaldehyde, or homologues of the aldehyde series, or polymerized forms of formaldehyde, or such compounds containing the methylene group.

The alkaline solution of peat starts the reaction at room temperature. The reaction is hastened and rendered more complete by heat.

The alkaline solution of peat serves as a condensing agent and becomes an essential part in forming the plastic substances.

The viscosity of the product formed indicates the progress of the reaction. The continuation of the reaction yields a more viscous product the final product being an insoluble and infusible mass. Preferably the material in a viscous state is transferred to a mould or other suitable vessel where the process may be continued to produce the final insoluble and infusible mass in the shape desired for use.

A wide variety of compositions may be prepared from the peat-phenol-aldehyde plastic, by incorporating solid, semi-solid, or liquid materials of the most varied nature. The addition of such substances may be made before the reagents are mixed, or while the reaction process is going on, or before or during the final hardening.

By the term "reaction process" I mean the reaction among the alkaline solution of peat, a phenol and an aldehyde.

When the alkaline solution of peat, a phenol and an aldehyde are allowed to react, without the addition of fillers, the plastic mass formed is homogeneous in structure and ranges from brown to black in color.

([1]) "Asphalt and Allied Substances," by Abraham.
([2]) The Uses of Peat for Fuel and Other Purposes. (U. S. Bureau of Mines, Bulletin #16.)

By the term "plastic" I mean a mass that is capable of being shaped or molded by heat and pressure into a compact mass.

In order to enable those skilled in the art to practice the present invention, I give the following specific example:

*Example 1.*—Phenol 60 parts by weight, commercial formaldehyde 70 parts by weight, peat 20 parts by weight, sodium hydroxide 10 parts by weight.

It should be understood that the precise conditions herein set forth are intended to be merely illustrative and not to limit the scope of my invention. The proportions of the ingredients may be considerably varied and the mode of application or compounding will depend upon the results sought. I do not limit my invention to Example No. 1, since modifications will suggest themselves to those skilled in the art, without departing from the spirit of my invention.

Having now described my invention, what I claim and desire to protect by Letters Patent is as follows:

1. As a new composition of matter, a product formed by the interaction of an alkaline solution of peat, a phenol and an aldehyde.

2. As a new composition of matter a product formed by interaction of an alkaline solution of peat with a phenol and an aldehyde in which is incorporated a filler.

3. A soluble fusible reaction product of an alkaline solution of peat and a phenol and an aldehyde which on heating forms an insoluble and infusible mass.

4. A molded article comprising a condensation product of a peat derivative and a phenolic body with an aldehyde.

5. The process of producing a plastic and elastic substance comprising causing an alkaline solution of peat to interact with a phenol and an aldehyde to form a soluble and fusible mass, and heating the mass under pressure to produce an insoluble and infusible mass.

6. The process of producing a plastic and elastic substance comprising causing an alkaline solution of peat to interact with a phenol and an aldehyde to form a soluble and fusible mass adding a filler to the mass, and heating the mixture to produce an insoluble and infusible mass.

7. The process of producing a plastic and elastic substance comprising forming an alkaline solution of peat, causing the solution to interact with a phenol and an aldehyde to form a soluble and fusible mass, and heating the mass to produce an insoluble and infusible mass.

8. The process of producing a plastic and elastic substance comprising causing an alkaline solution of peat to interact with a phenol and an aldehyde.

9. In the manufacture of plastic matter the process which comprises reacting an alkaline solution of peat with an aldehyde and a phenolic body.

The specification signed this 20th day of Feb., 1928.

ISADORE SIDNEY MELLANOFF.